United States Patent [19]

Templin

[11] 3,794,941

[45] Feb. 26, 1974

[54] AUTOMATIC ANTENNA IMPEDANCE TUNER INCLUDING DIGITAL CONTROL CIRCUITS

[75] Inventor: Lawrence R. Templin, La Mirada, Calif.

[73] Assignee: Hughes Aircraft Company, Culver City, Calif.

[22] Filed: May 8, 1972

[21] Appl. No.: 251,232

[52] U.S. Cl. ................. 333/17, 324/57 R, 328/109, 334/47

[51] Int. Cl. ............................................. H03h 7/40

[58] Field of Search ...... 333/17; 325/171, 174, 177; 334/47, 55, 56, 65, 69

[56] References Cited

UNITED STATES PATENTS

| | | | |
|---|---|---|---|
| 2,745,067 | 5/1956 | True et al. | 333/17 |
| 3,443,231 | 5/1969 | Roza | 333/17 X |
| 3,509,500 | 4/1970 | McNair et al. | 333/17 |
| 3,281,721 | 10/1966 | Clark | 333/17 M |

*Primary Examiner*—Paul L. Gensler

*Attorney, Agent, or Firm*—W. H. MacAllister; R. J. Rengel

[57] ABSTRACT

An automatic antenna tuner includes digital control circuits for selecting reactive tuning elements of an antenna impedance matching network. The tuner arrangement provides for rapid transforming of multiple antenna impedances to the load resistance required for efficient transfer of power from a power amplifier of a portable radio transmitter to any selected antenna over a broad frequency range of 2 to 80 MHz, for example. The impedance matching network includes series inductive elements and shunt capacitive elements in an L configuration. Both inductive and capacitive elements are incrementally adjustable in binary value and are adjusted automatically by digital control of latching relays in response to sensed antenna impedance to switch component values in a binary sequence. The tuning of the antenna for matching to the power amplifier is detected by individual phase and impedance broad band sensors for sequencing of capacitive and inductive reactances to approach 0° phase and the desired load resistance for efficient power transfer. The tuning is continuously monitored by a voltage standing wave ratio (VSWR) sensor which initiates and controls the duration of the tuning cycles according to the detected antenna impedance matching condition.

31 Claims, 14 Drawing Figures

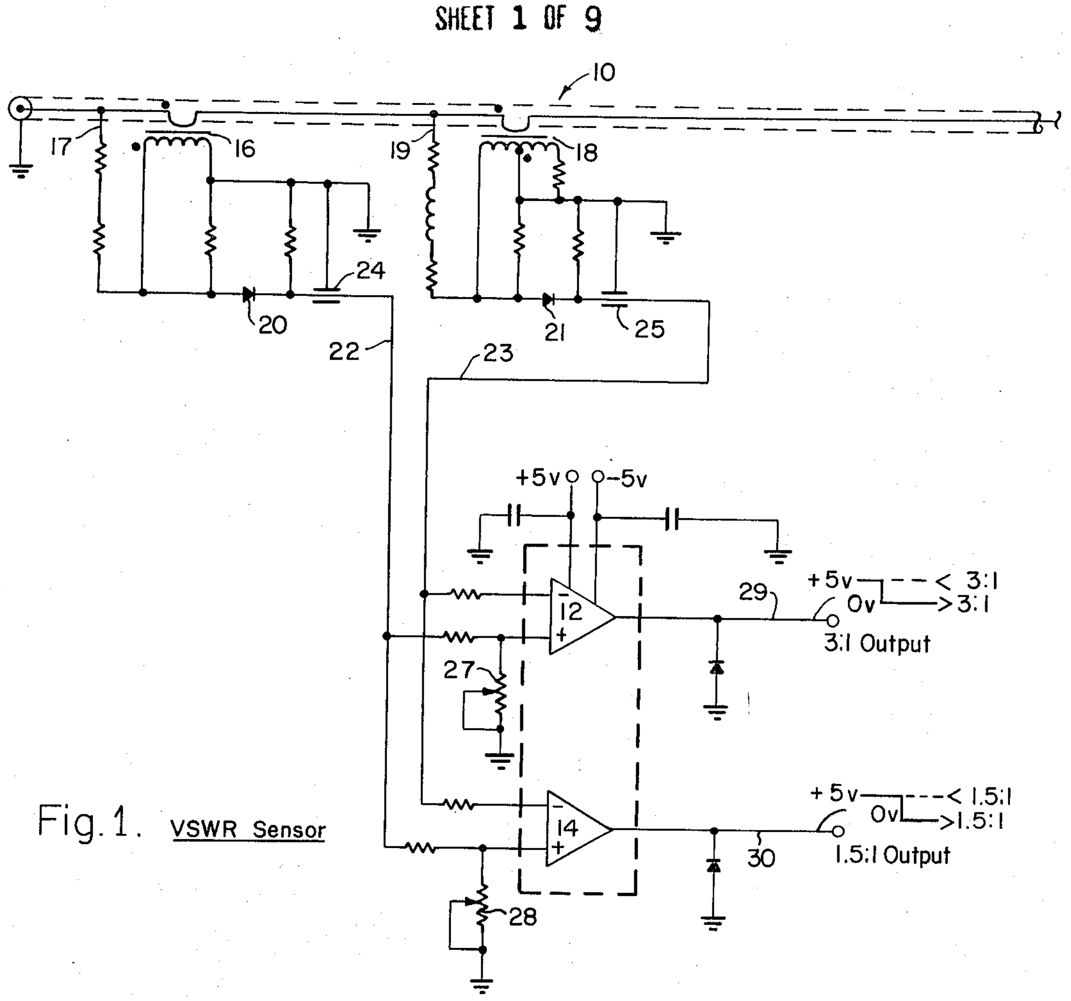
Fig. 1. VSWR Sensor
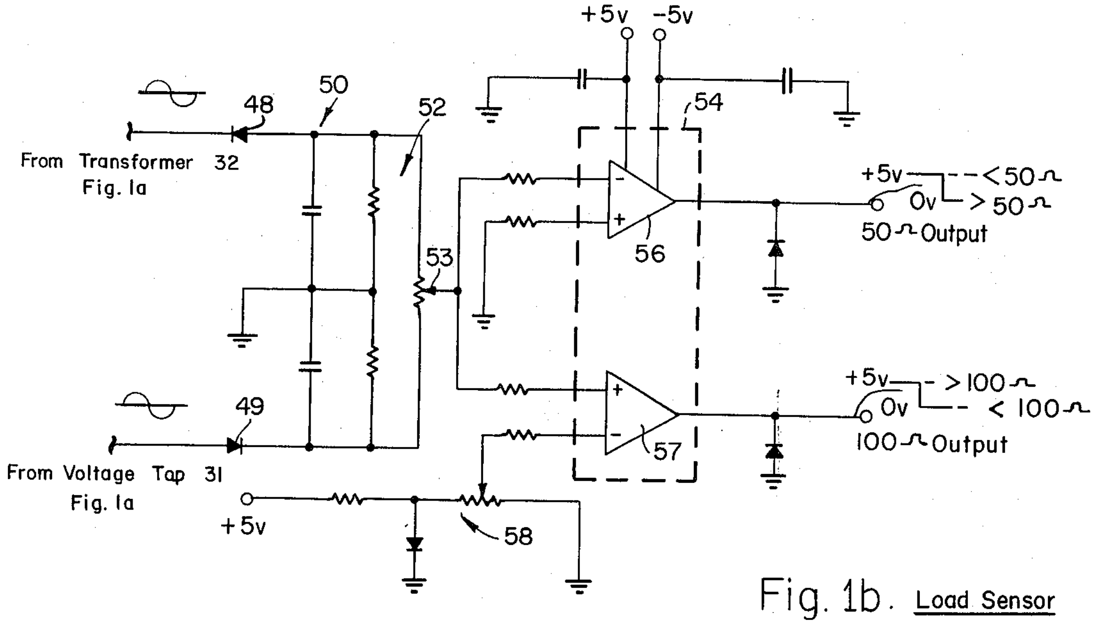
Fig. 1b. Load Sensor

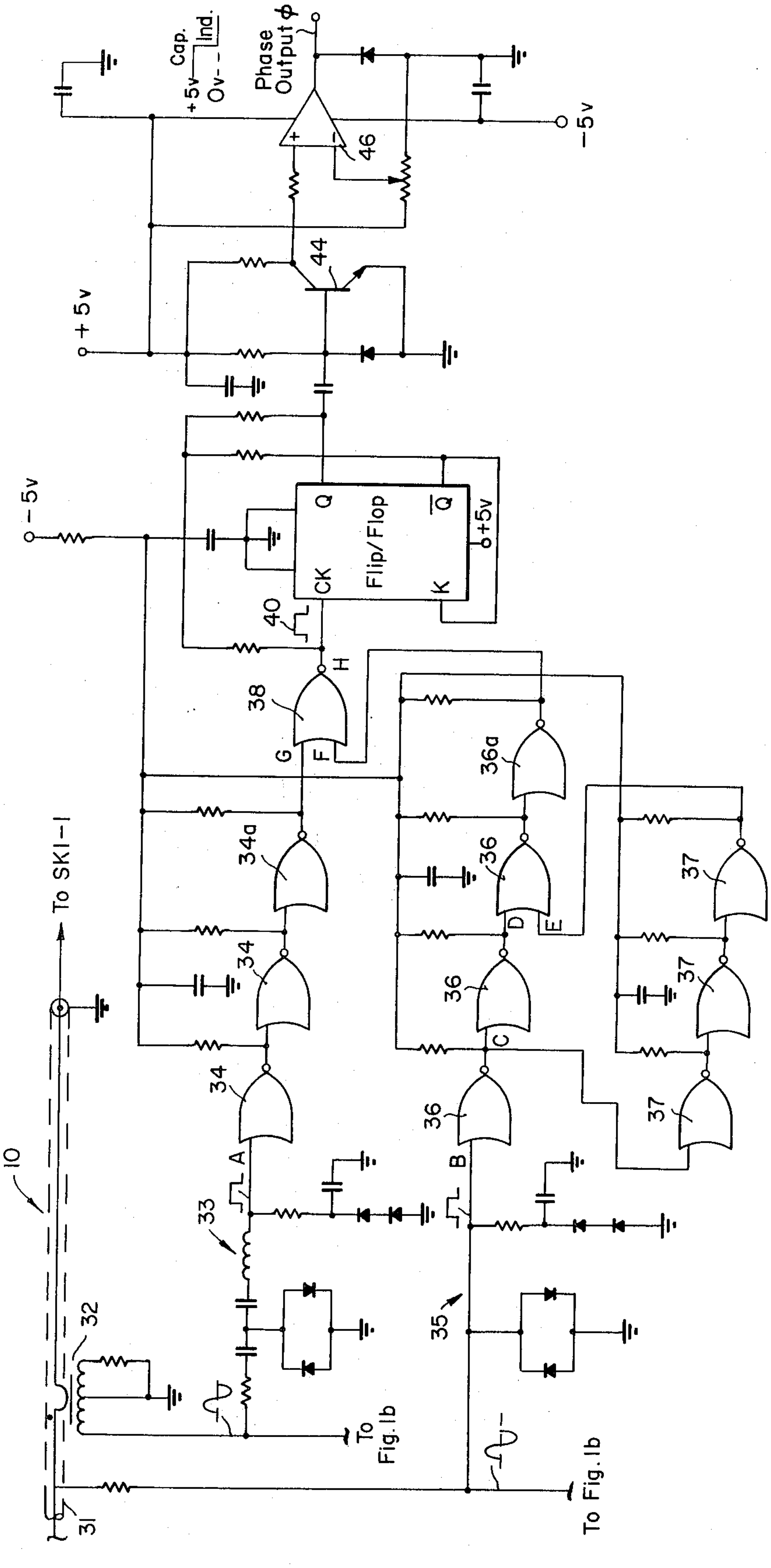
Fig.1a. Phase φ Sensor

Fig. 4 VHF Control Logic 70, Fig. 4a

AUTOMATIC ANTENNA IMPEDANCE TUNER INCLUDING DIGITAL CONTROL CIRCUITS

BACKGROUND OF THE INVENTION

In order to provide an efficient transfer of power from the power amplifier of a radio transmitter to its antenna, antenna tuning must be provided to achieve the efficient power transfer. Accordingly, the function of the antenna tuner is to transform the impedance of the antenna to the load resistance required for the power amplifier output stage of the transmitter.

Providing an automatic antenna tuner for a lightweight transceiver, e.g., a battery powered, portable radio transmitter/receiver, presents many difficult problems because of the need for fast tuning and lower power consumption to match individual ones of multiple antennas. The difficulties are not confined to a single problem area and include physical size of the tuning elements required for high power transmission which elements are not readily adaptable to low volume lightweight packaging requirements. Another problem area is providing for the use of more than one antenna which imposes additional requirements on the tuner in that the tuning elements must be larger and a larger number of elements are required to encompass the additional parameters and wide frequency band while maintaining adequate resolution to meet required antenna impedance matching requirements. More particularly, as the reactive tuning elements become larger to provide matching of individual antennas, higher RF voltages are developed in the tuner which in turn increases the physical size of the elements. Also, as the frequency range is increased, the tuner requirements become even more stringent. At higher frequencies, for example, improved resolution is necessary in the tuning elements in order to provide very small amounts of reactance required to provide efficient power coupling between the power amplifier and the antenna.

In satisfying the foregoing requirements of larger reactance values and larger number of elements and protecting against the higher RF voltages due to physical size of the elements, additional problems are introduced, namely, stray inductance and capacity become a severe problem at higher frequencies where the stray impedance can be large enough to mask the antenna parameters and thereby make it difficult or impossible to recognize the proper tuned or resonant point located below the allowable VSWR level. Further, the automatic tuning must be performed with a limited power supply available for portable equipment. Accordingly, the power drain for implementing the automatic tuning process must be limited to that available from low volume lightweight packaging power sources.

Fully auomatic operation of the tuner in itself provides a desirable advantage. Further, the automatic operation should be complemented by a minimum time period for tuning for rapid transmission of signals. In practice it has been found that the desired time period for tuning should be less than 10 seconds. One of the commonly employed tuners of the prior art consists of a rotary switch containing combinations of fixed reactive elements. The limited number of required combinations of inductors and capacitors, i.e., individual tuned circuits, and the time period required to insert each of the tuned circuits is longer than desirable, i.e., substantially in excess of 10 seconds.

In many of the automatic tuner arrangements, of the prior art, some method of preloading the antenna is employed. This is required due to the wide frequency range of any given antenna, or if the same tuner is to interfere with and provide tuning for more than one antenna. As the frequency range becomes large, the number of reactive elements increase, particularly at the lower frequencies. This increase is required over the larger antenna impedance range while maintaining sufficient resolution to obtain the desired high degree of impedance matching as detected by VSWR sensor, e.g., 1.5:1 or less. However, if the number of switched elements becomes too large, the tuning time increases rapidly and the line losses also increase, which limits the maximum tunable frequency.

The radio frequency power level developed within a tuner can become a problem when fast switching devices and miniaturized packaging is utilized in the tuner design. During the transmission mode, high voltages are developed across the reactance tuning elements and across switching devices for insertion or removal from the tuning circuit and at the present time, most solid state switches are not capable of operating at these high voltages.

SUMMARY OF THE INVENTION

In the preferred embodiment of the automatic tuner of the present invention, a completely automatic tuner has been provided that matches accurately any one of five different antenna configurations, for example, to the output of the transmitter power amplifier. The antenna matching network of the tuner is a T-network arranged in a low pass configuration having latching type relays with a fast response to selectively insert inductances or capacitors to form an L network for varying the reactance values of the input and shunt legs of the T-network including the preload inductive elements. Digital control circuitry provides for selection of the relays for insertion of the individual reactive elements in the network and preload section. The fast response of latching relays provides for actuation and insertion of the elements in less than 3 milliseconds (3 msec). The power required for tuning is minimized and once a tune condition is reached, all primary power is removed from the tuner. A VSWR detector provides information relative to the tuned condition having been reached and remains operative during all transmission intervals. The monitoring of the tuner by the VSWR detector also provides for inhibiting high power during a period of transmission should a subsequent mismatch arise in the tuner, for example, due to a change of position of the transceiver.

As noted earlier, the use of a digital logic provides for high speed selection of tuning elements having binary values by means of latching relays. The relays in turn selectively insert the elements in the L matching network to control the reactance values which are related in a binary sequence provided by individual counters for inductances and capacitances which are inserted concurrently.

Individual phase and load sensors are provided to detect voltage and current samples of the transmitted signal to provide positive and negative decisions with regard to phase and impedance above or below either 100 ohm or 50 ohm impedance references. The 100 ohm reference is provided for selecting a proper preload reactance for preloading the selected antenna below 50 MHz of the broad frequency range of 2 to 80 MHz. The preload arrangement consists of a rotary switch which is indexed in response to the sensor outputs and the indexing continues until a reactance selected provides the L matching network with an antenna input impedance of approximately 100 ohms. After the proper preload impedance is obtained, the phase and 50 ohm impedance load sensor outputs provide logic level outputs to direct the relay control logic to insert and remove both inductance and capacitance elements in a binary sequence in the L matching network to provide the proper combination, out of $2 \times 10^6$ possible combinations, for at least a 1.5:1 VSWR operating condition.

The selected method for control of the tuning circuit elements requires two inputs, i.e., phase and impedance inputs indicative of the reactive condition of the selected antenna. The phase input is provided by the phase sensor which supplies a digital signal to the logic control circuits for switching capacitors in the antenna impedance matching network. The other control loop is responsive to the detected impedance provided by the load sensor which directs the logical control to switch the inductors in the antenna impedance matching network. The phase and impedance control loops are quasi-independent and are capable of operating simultaneously to reduce the time period of the tuning cycle. Since the inductive and capacitive elements are incremented in value digitally, the logical control is operated in a binary counting sequence, i.e., individual counters for inductive and capacitive components control the switching for insertion and removal of the individual capacitors and inductors in the impedance matching networks.

In the very high frequency (VHF) band from 50–80 MHz, antenna impedance matching is considerably simplified by providing a separate impedance matching network with fewer inductive and capacitive elements corresponding to the need for reactance in matching the antenna impedance at these higher frequencies. To reduce the effect of stray inductance and capacity, the VHF impedance matching network is isolated from the HF impedance matching network and in view of the smaller number of reactive elements required, the control sequence is simplified to tune in a substantially smaller time interval than required for the high frequency range.

Digital implementation of a tuning algorithm provides a substantial improvement to automatic antenna tuning. Further, dual sensors (phase and impedance) algorithm is far less complex than a single sensor algorithm, i.e., the dual sensor requires no analog-to-digital conversion, for example, and results in approximately 90 percent less power consumption during a tuning cycle.

In view of the foregoing, it is an object of the present invention to provide an automatic antenna tuner having the foregoing features and advantages.

Another object is to provide for antenna tuning automatically to overcome the need for an experienced or trained operator for radio transmitters.

Another object of the present invention is the provision of digital logic for the control of an antenna matching network.

A further object of the invention is to provide an improved automatic tuner for transforming the impedance of an antenna to the load resistance required for efficient transfer of power from the power amplifier to the antenna.

Still another object of the present invention is to provide a high speed automatic antenna tuner for a portable transmitter.

Another object is to provide an antenna tuner for automatically tuning any selected antenna over a broad band of frequencies.

A further object of the present invention is the provision of individual reactances incremented in value digitally and sequenced to provide a maximum number of possible combinations available in a minimum time period and with minimum logic control interface.

A still further object is to provide for reduction in power required for tuning a portable radio transmitter.

Another object of the present invention is the provision of automatic selection of the proper preload reactance required in a high frequency band.

A further object is to provide continuous monitoring of the tuning status during transmission to detect ambients effecting antenna impedance and resulting efficiency in transmission.

A further object is the provision of independent and simultaneous sensing and control of phase and impedance of antenna impedance components including independent logical control for the respective components.

Other objects and features of the invention will become apparent to those skilled in the art as the disclosure is made in the following detailed description of a preferred embodiment of the invention.

FIG. **1*a*** is a diagram of a phase sensor of the preferred embodiment for sensing the phase of the reactive component of the antenna coupling network and providing control signals for tuning to eliminate any excessive reactive antenna component.

FIG. **1*b*** is a circuit diagram of a load sensor for detecting antenna impedance components for controlling the inductive reactance in a tuning cycle of the preferred embodiment of the present invention.

FIG. **1*c*** is a timing diagram for illustrating the operation of the phase sensor.

Figure 2:
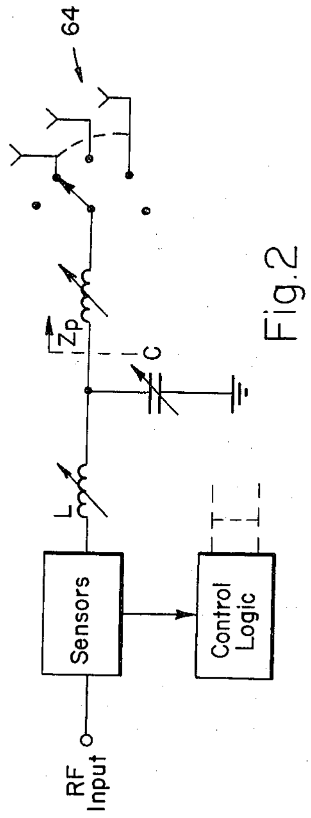

FIG. 2 is a simplified schematic diagram of the automatic tuner of the preferred embodiment of the invention.

Figure 3:
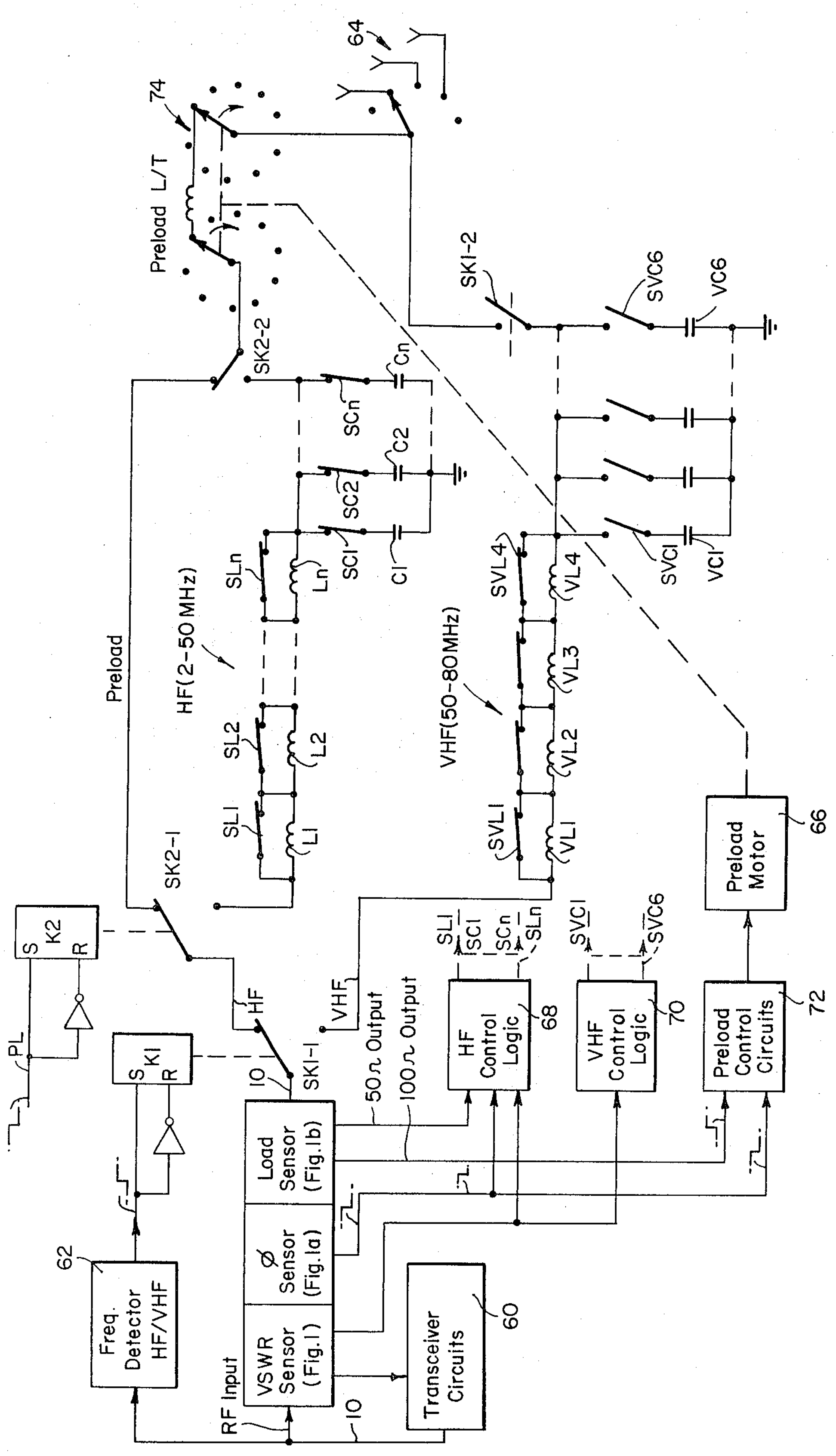

FIG. 3 is a schematic diagram of the preferred embodiment for showing the circuits for high frequency (HF) and very high frequency (VHF) antenna impedance matching networks and the sensors and control logic therefor by block diagram.

Figure 4:
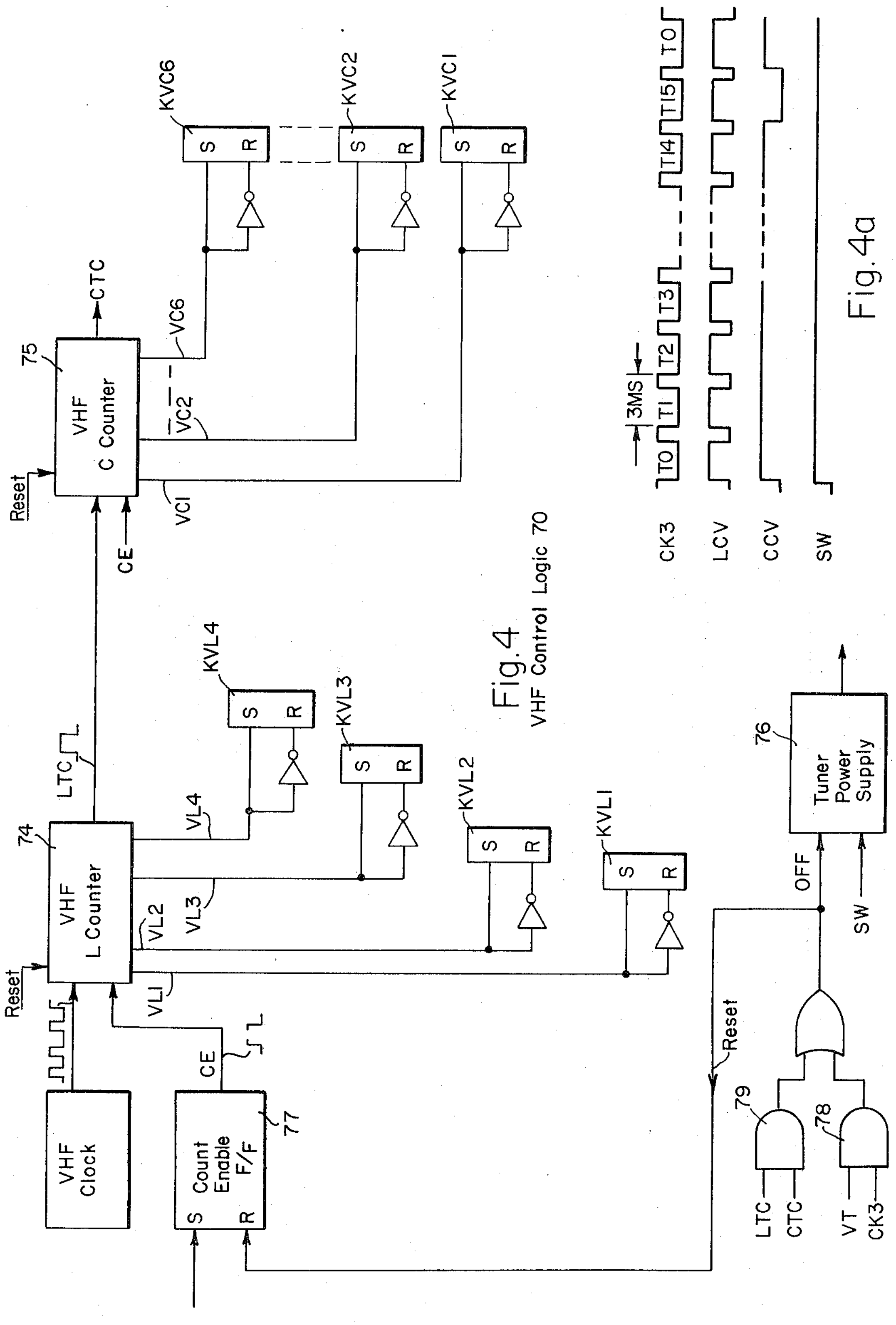

FIG. 4 is a block diagram of the very high frequency VHF control logic for control of the VHF impedance matching network shown in FIG. 3.

FIG. **4*a* is a timing diagram for illustrating the operation of the VHF control logic shown in FIG. 4**.

Figure 5:
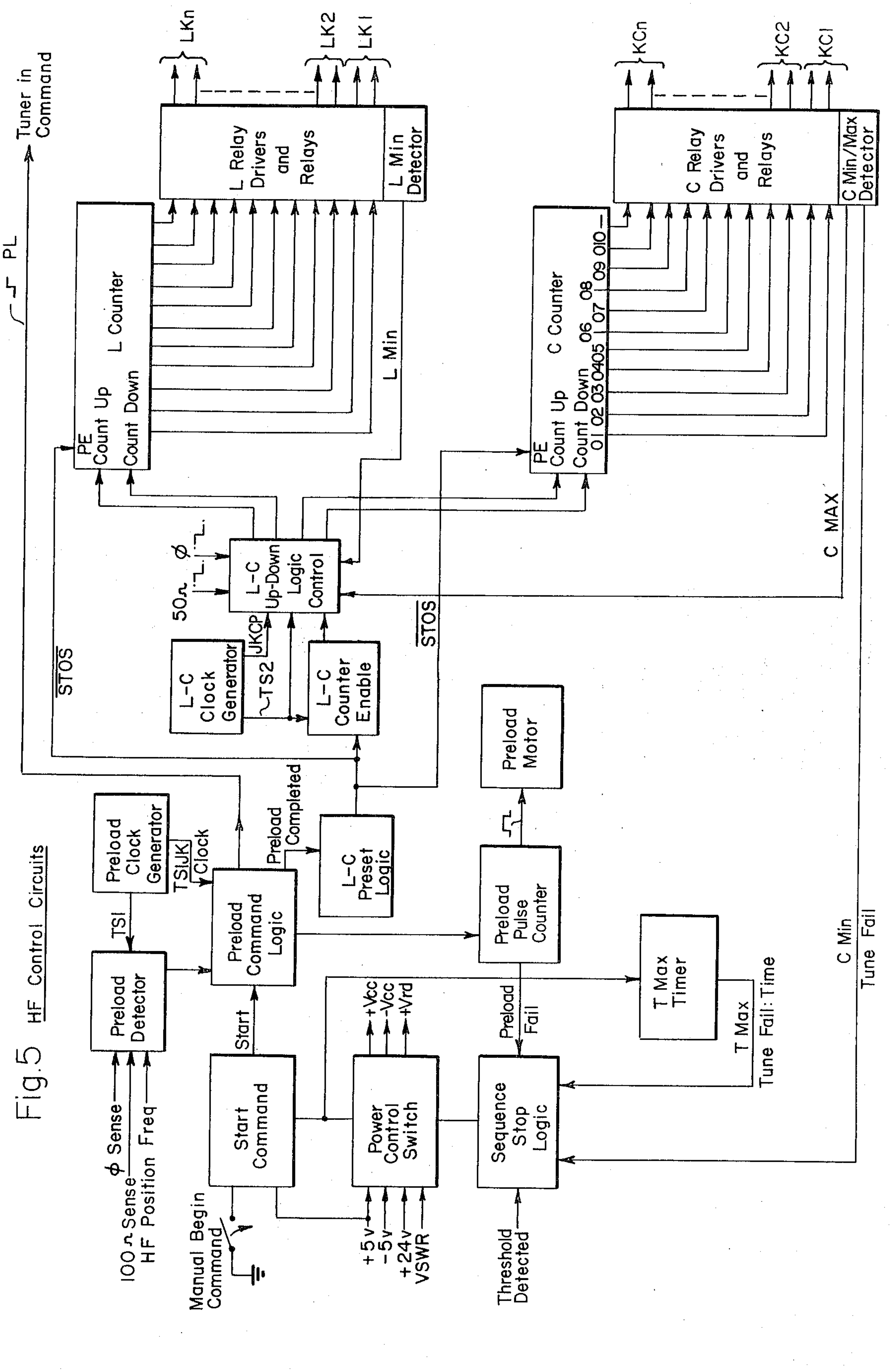

FIG. 5 is a block diagram of the high frequency (HF) control logic for controlling the HF impedance matching network and preload inductance for transmission frequencies in the high frequency range and shown in FIG. 3.

Figure 6:
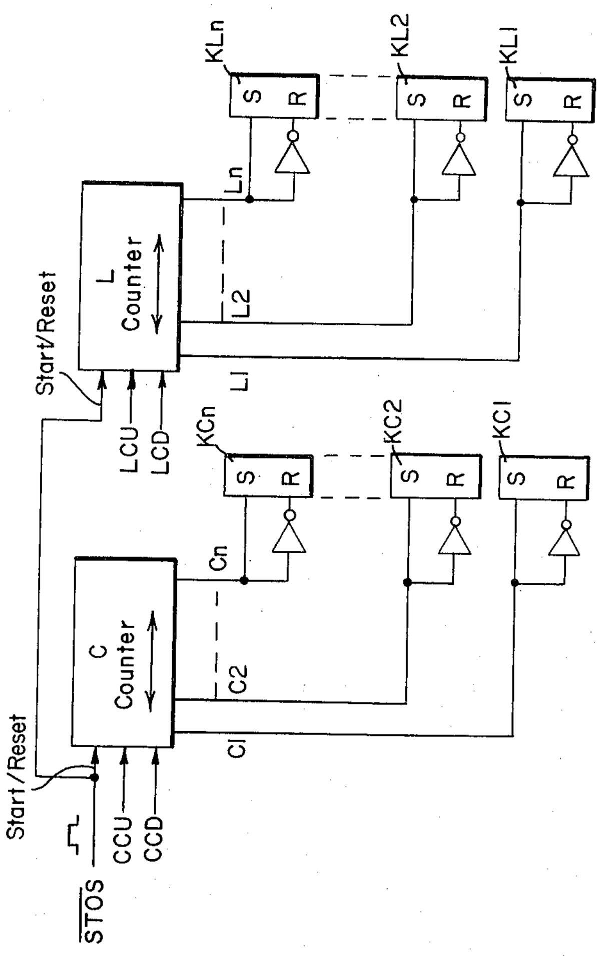

FIG. 6 is a schematic diagram showing certain details of the interconnection and relays illustrated in block diagram in FIG. 5.

Figure 7:
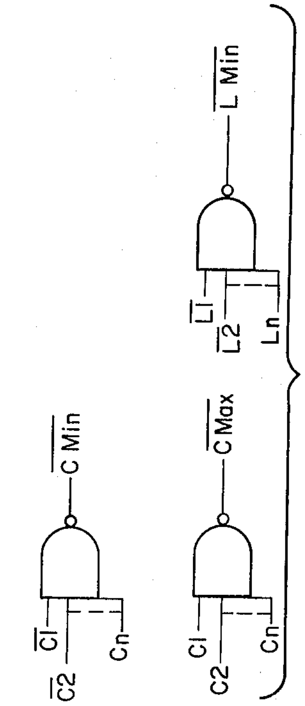

FIG. 7 is a logic schematic diagram showing details of the L and C detectors shown in block diagram in FIG. 5.

Figure 8A:
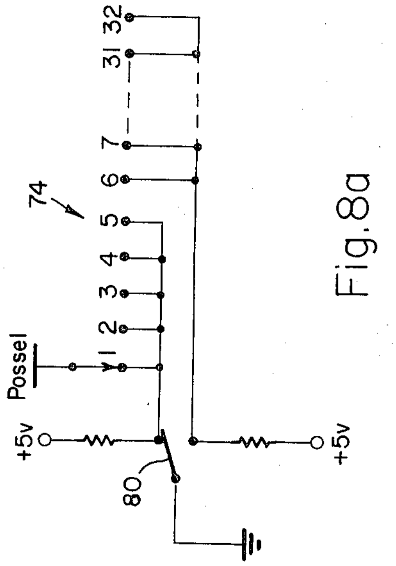
Figure 8:
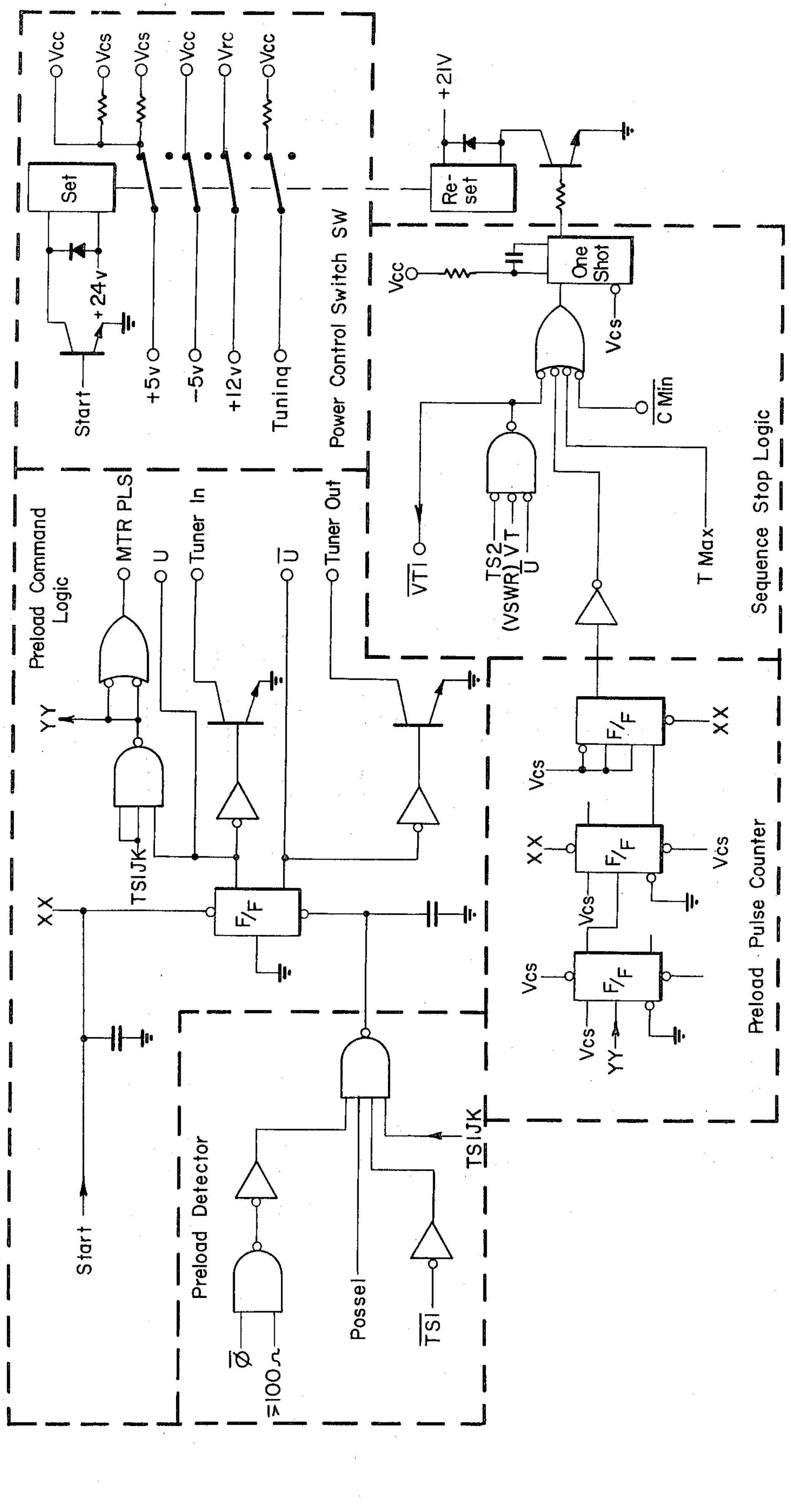

FIG. 8 is a detailed logical schematic for illustrating the preload control logic illustrated in the block diagram in FIG. 5.

FIG. 8*a* is a circuit diagram of a preload position detector circuit for supplying control signals according to frequency range in the HF band, to the preload detector shown in block form in FIG. 8.

Figure 9:
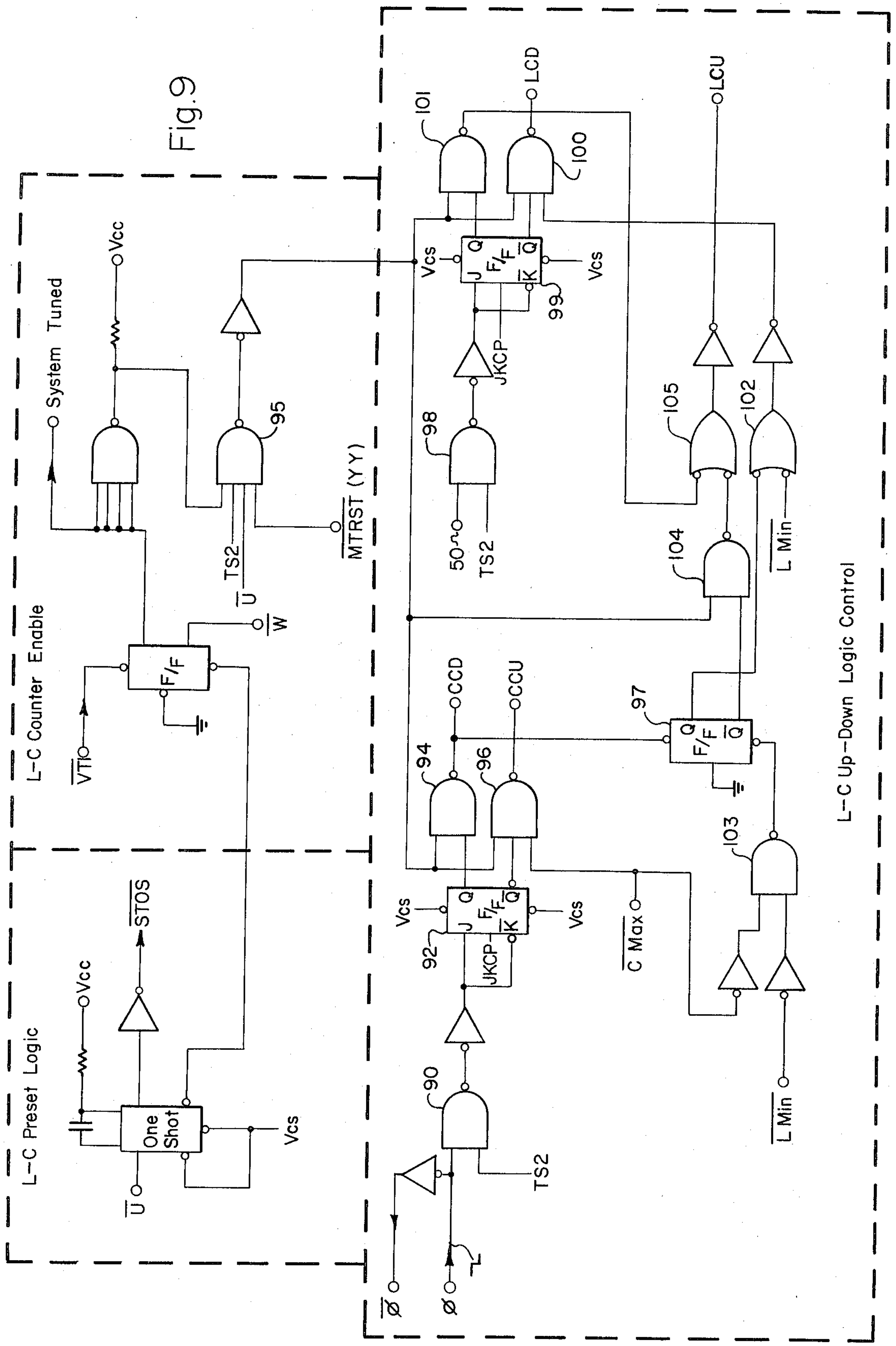

FIG. 9 is a detailed logical schematic diagram of high frequency control logic shown in FIG. 5.

Referring now to the drawings, FIGS. 1, 1a and 1b illustrate schematically phase and impedance sensing circuits for automatic sensing of antenna parameters including selected antenna frequency preload requirements. In general, these circuits provide broadband coverage of frequencies from 2 to 80 MHz for antennas of widely differing impedance and each having substantial impedance excursions over the band of frequencies, e.g., varying impedance characteristics in the range of 60 ohms to 1,500 ohms at about 26 MHz for 6 and 9 foot whip antennas. Two of the sensing circuits, the phase and load sensors shown in FIGS. 1*a* and 1*b*, provide independent and simultaneous detection of impedance and phase antenna parameters to provide digital control signals for individual steering of logic circuits controlling capacitive and inductive tuning elements respectively. The remaining sensor (VSWR) monitors the antenna voltage standing wave ratio for starting and terminating tuning cycles, for transmission in the frequency range of the broadband frequency coverage.

Accordingly, the sensing circuits of FIGS. 1, 1*a* and 1*b* are directed to detecting selected antenna conditions at the selected operating frequency to produce feedback control signals for steering of logic circuits for digital sequencing of reactive components for tuning. Further, to satisfy the need for rapid tuning over a wide range of frequencies, e.g., 2 MHz to 80 MHz, tuning is implemented by parallel sequencing of capacitive and inductive tuning elements in the high frequency (HF) band of 2–50 MHz. The phase and load sensors of FIGS. 1*a* and 1*b* independently analyze the impedance and phase components of the selected antenna and provide separate control signals to the logic control circuits for concurrent sequencing of the capacitors and inductors in the tuning circuit to provide a tuned condition at the transmission frequency.

As shown in FIGS. 1, 1*a* and 1*b*, low power, voltage and current carrier wave signals are coupled to each of the sensors from line taps on a transmission line 10 which is connected to an RF amplifier requiring a 50 ohm output impedance for transmission over the broadband frequency range of 2 to 80 MHz. The transmission line tap interruptions are preferably contained in a minimum length of line so that the sample input signals track over the frequency range. In general, the circuitry and packaging of the sensors maintain minimum losses to enhance the broadband frequency range. For example, the transmission line 10 comprises a coaxial cable one-half inch in length with voltage taps and toroidal transformers located within the length of the cable. Due to the transmission line taps and interruptions being contained in the minimum line length, sampled voltages track over the frequency range due to minimum change in losses or voltage level which directly effect the linearity and sensitivity of the sensors outputs.

In FIG. 1 the VSWR sensor is shown to provide two outputs, namely, 3:1 and 1.5:1 outputs from respective operational amplifiers 12 and 14, each supplied voltage and current samples of the transmitted signal at the respective voltage and transformer couplings to the transmission line 10. Coupling transformers 16 and 18 are of opposite polarity to provide forward and reflected current signal samples. Signals from coupling transformer 16 and a DC voltage tap 17 are combined to produce a positive detected voltage corresponding to the forward transmission signal on transmission line 10. Signals from the other pair, coupling transformer 18 and voltage tap 19, are combined to produce a positive detected voltage corresponding to the reflected transmission signal on the transmission line 10. Diodes 20 and 21, in combination with their respective associated load resistors, produce the positive detected voltage on respective lines 22 and 23 for the forward and reflected signal samples. An AC filter is provided by capacitors 24 and 25 which are coupled to ground as shown to provide positive DC signals to the VSWR sensor.

The derived forward signal on line 22 is applied to the positive inputs of the dual DC operational amplifiers 12 and 14 and the derived reflected signal on line 23 is applied to the negative inputs. Each positive input of the dual operational amplifiers includes respective voltage dividers 27 and 28 for adjusting the threshold level of the respective amplifiers. Filtered voltage supplies of +5 and −5 volts are coupled to both of the amplifiers as shown for amplifier 12, and the outputs are limited by diodes coupled to output lines 29 and 30. Operational amplifier 14 provides the 1.5:1 VSWR output wherein the higher level of the control signal indicates a voltage standing wave ratio of 1.5:1 or less for terminating the tuning cycle. As long as this 1.5:1 output remains at the lower logical level (OV), the tuning cycle will continue as controlled by digital control circuitry in response to phase and impedance sensor outputs as described later.

The other control signal output from operational amplifier 12, on output line 29, provides a low logical level control signal indicating the voltage standing wave ratio of greater than 3:1 which can be used to signal the operator to begin the new tuning cycle or alternatively can provide a start signal for initiating a tuning cycle.

Referring now to 1*a*, the circuit for detecting the phase of the antenna impedance is designated the phase sensor which derives voltage and current (voltage) signal samples from the transmission line at voltage tap 31 and current transformer 32. As in the VSWR sensor of FIG. 1, a low power carrier wave signal (e.g., 2 watts) is required to provide sensor input signals. The voltage sample taken at tap 31 of transmission line 10 is applied undetected to the phase sensor of FIG. 1*a* and is also coupled to the load sensor of FIG. 1*b* after detection. Also, as discussed in connection with the VSWR sensor of FIG. 1, the transformer 32 is connected in series with the transmission line 10 for extracting a sample for detecting any phase of the antenna reactance by the phase sensor of FIG. 1*a* and is also applied to the load sensor of FIG. 1*b* after detection.

In the phase sensor, FIG. 1*a*, the signal supplied by the transformer 32 is capacitively coupled through an isolation network 33 to a series of three NOR gates 34. These gates 34 and the remaining gates shown in FIG. 1a provide fast rise times and constant amplitude pulse waveforms over the full frequency range of operation. A gate of this type is supplied by Motorola Semiconductor Division as a "MECL III" gate.

The other input to the phase sensor is the voltage sample supplied from the voltage tap 31 which is coupled into the phase sensor through a constant load network 35. This voltage sample is then coupled to a gating arrangement including NOR gates 36 and 37 to produce a fixed delay which delayed signal is applied to input F of a summing gate 38.

Figure 1C:
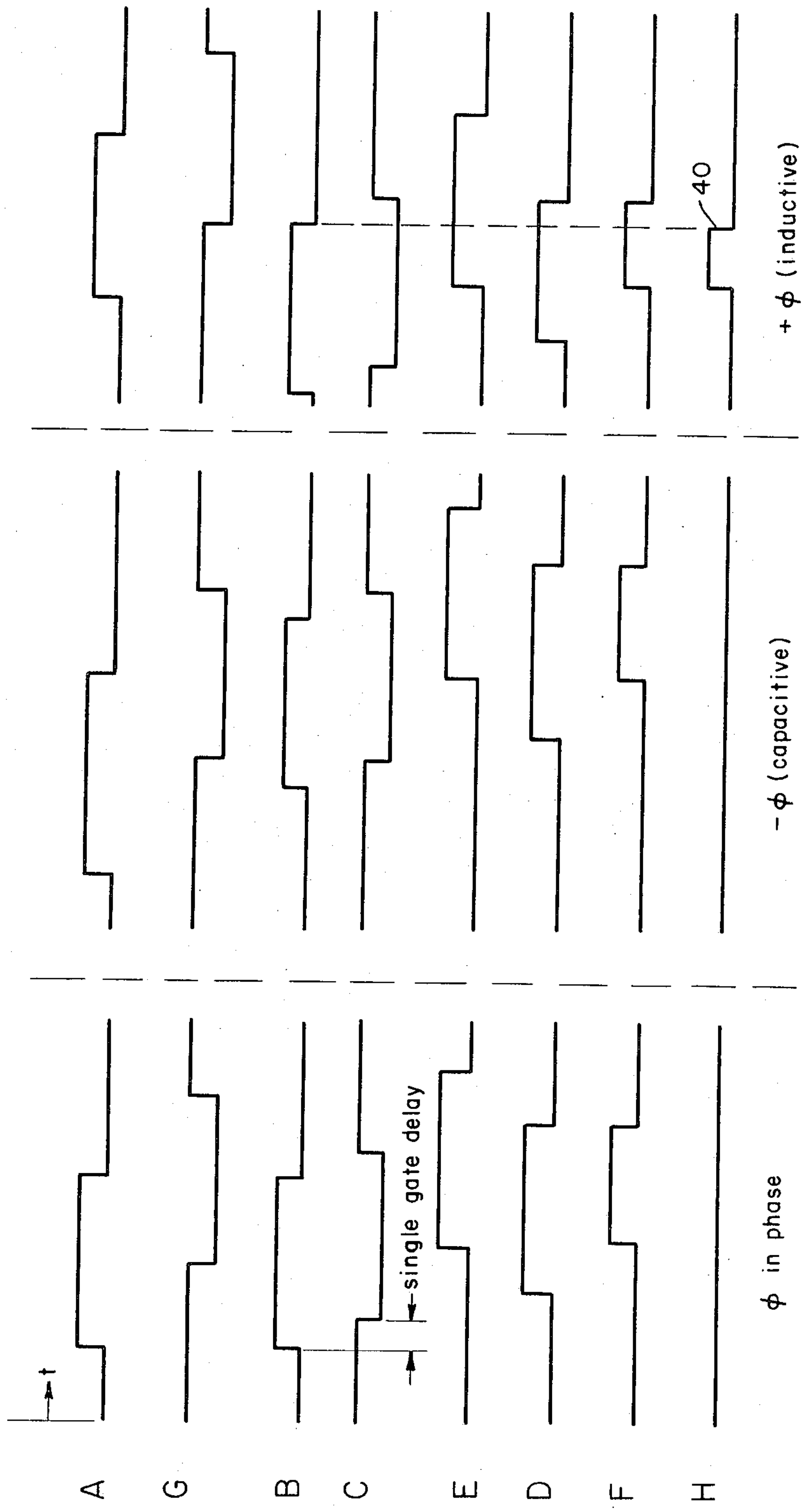
FIG. 1 is a circuit diagram of a VSWR sensor of the preferred embodiment of the present invention for detecting the voltage standing wave ratio for initiating and controlling the duration of a tuning cycle.

A timing diagram in FIG. 1*c* illustrates the operation of the series of gates for deriving a pulse output from the summing gate 38 in response to signal samples derived from transformer 32 and voltage tap 31. As shown by the third column of waveforms, indicated + $\phi$ (inductive), a positive pulse 40 is produced at the output H of summing gate 38 only when the transformer signal sample A lags the voltage tap sample B to provide a positive pulse train at the output H of the summing gate 38 (FIG. 1*a*). The letters A-G are also shown in FIG. 1a as inputs to certain ones of the gates in the network. Thus, when transformer and voltage signal samples are in phase, as shown in column 1 of FIG. 1c, or a negative phase angle is exhibited between sample signals, as shown in column 2 of FIG. 1*c*, no pulse output is produced at the output H of summing gate 38. Accordingly, a pulse train results only from a positive phase angle and leading or lagging signals correspond to the antenna appearing either inductive or capacitive and detection of the inductive condition produces the pulse train at the output H.

The output of summing gate 38 is applied to clock input CK of flip flop 42 having interconnected J-K inputs which provide a pulse output Q at one-half the input pulse rate. While the pulse rate is decreased, the circuit gain is increased to control a driver 44 which is AC coupled to the output Q. The output of the driver 44 is applied to the + input of a high gain DC operational amplifier 46 having a − input which is coupled to a threshold adjustment to compensate for individual circuit parameters and to precisely place the threshold level at 0°. The positive input to operational amplifier 46 integrates the pulse train input to provide the digital output signal as shown, in which the high logical level (+5v) is indicative of a capacitive antenna load ($-\phi$) and the low logical level (0v) is indicative of an inductive antenna load ($+\phi$).

Operational amplifier 46 has a high gain and implemented for fast crossover from capacitive to inductive levels, i.e., occurs within + or −6° about the in phase or 0° phase differential over the broad band frequency range. As noted earlier, the transmission line taps and interruptions are contained in a minimum line length, e.g., preferably one-half inch, and less than three-quarters of an inch, to provide for sample signals from transmission line 10 which track over the frequency range of 2–80 MHz. Any change in losses or voltage level directly affects the linearity and sensitivity of the sensor outputs.

Referring to FIG. 1*b*, the load sensor is supplied sample signals from voltage tap 31 and transformer 32 on transmission line 10. Whereas the phase sensor independently analyzes the phase angle of the antenna load, the load sensor shown in FIG. 1*b* is responsive to the sample signals from transmission line 10 to analyze the impedance component of the antenna load under the phase conditions to provide a separate control signal to the inductive sequence logic for insertion of inductive elements including tuning transformers in the T matching network shown in FIG. 3 including the preload section of the T network.

The input circuit to the load sensor detects transformer and voltage tap signals. The two signals are diode detected in opposite senses by diodes 48, 49 in the input circuit 50, which detected signals are summed in a common load 52. The voltage level at adjustable tap 53 of the load resistor is applied to opposite inputs of a dual DC operational amplifier 54 including amplifiers 56 and 57. The voltage from tap 53 is applied to the − input of amplifier 56 to provide a digital output having a high logical level (+5v) indicating an antenna load of less than 50 ohms and a low logical level (0v) indicating an antenna load of greater than 50 ohms. The 50 ohm output is a command signal applied to the inductive sequence logic of the high frequency (HF) digital control circuits (FIG. 3).

The voltage level at tap 53 is applied to the + input of amplifier 57 to provide a digital signal at the 100 ohm output wherein the high level signal indicates an antenna load of greater than 100 ohms and the lower level signal indicates an antenna load of less than 100 ohms. This digital signal from the 100 ohm output is a command signal from the load sensor to the preload control circuits (FIG. 3) of the antenna tuner. The negative input to the amplifier 57 is coupled to a threshold adjustment circuit 58 to provide an offset bias whereby the circuit operation can be adjusted precisely to detect a 100 ohm impedance and produce a change in level at the output at 100 ohms.

The time period required for tuning is minimized by the use of automatic sensing of antenna parameters and any preload requirement. By parallel sensing of phase and impedance parameters by individual sensors, the tuning cycle is substantially reduced including an average preload tuning time interval of one-half second and an L matching network tuning time interval of 0.8 second, or a total average time period of a tune cycle of 1.3 seconds. At the present time, reduction of the time period of the tuning cycle is limited primarily by relay activation time and as solid state devices become available, which can tolerate the resonant power conditions, the tuning cycle time period will be decreased substantially.

One of the more important features of the present invention is the broad frequency range of the sensing circuits, particularly the monitoring of the antenna reactances continuously to provide a rapid, flat response over the full frequency range enabling accurate tuning to voltage standing wave ratios (VSWR) of less than 1.5:1. Also, independent and simultaneous sensing and control of the real and reactive antenna components reduces the time period of the tuning cycle approximately 50 percent. Accordingly, in addition to having the individual sensing circuits, separate logical control circuits for controlling the inductive and capacitive tuning elements is derived from the two independent phase and load sensors whose operation is quasi independent.

Referring now to FIG. 2, the simplified schematic diagram shows the preferred configuration of the present invention to include an RF input coupled to the output of the radio transmitter, of transceiver circuits 60 VSWR, phase $\phi$ and load impedance sensors in the input control logic, an antenna matching T network and multiple antennas selectively coupled to the antenna matching network. The impedance matching of any selected one of the multiple antennas over the high frequency range is provided with rapid tuning and lower power consumption by parallel sensing of the antenna phase and impedance to provide command signals for individual digital control circuitry for inductive and capacitive requirements for tuning. The impedance matching networks for respective frequency ranges include series inductive and shunt capacitive elements in an L configuration. Both inductive and capacitive elements are incrementally variable in binary value and are varied by digital control of latching relays to switch component values of inductors and capacitors in a binary sequence.

Briefly, the tuning operation for VHF consists of, for example, allowing the inductive elements to cycle incrementally through the range of binary inductance values continuously changing the capacitive value one increment at the end of each inductive cycle. On the other hand, for HF, the inductive and capacitive elements are incremental by parallel sequencing via separate control circuits.

Referring to FIG. 3, a more detailed diagram of the present invention is shown by the block and circuit schematic diagram in which the transceiver circuits, including the radio transmitter, and power amplifier therefor, are illustrated by a block 60 having an output coupled to transmission line 10 for providing the RF input to the antenna tuner system of the present invention. The RF signal coupled to the transmission line 10 provides carrier signal inputs to the sensors by voltage and transformer couplings as shown in the FIGS. 1, 1*a* and 1*b*, and the line 10 is selectively connected to either the high frequency (HF) antenna matching T network, including the preload inductance or the very high frequency (VHF) antenna impedance matching L network by movable switch contacts SK1–1,2 which are actuated by relay K1 according to the frequency range of the signal being transmitted i.e., a frequency detector 62 provides a digital output according to the frequency range in which a high level output actuates relay K1 at the set input to connect the transmission line 10 to the selected one of the multiple antennas 64 via the T matching network including the preload inductance and via the L matching network by a low level output which is inverted to actuate relay K1 at the reset input. Relay K2 is responsive to the input signal at input PL to provide isolated tuning of the preload prior to tuning of the L portion of the high frequency matching network. In the actuated position of K1, the RF signal supplied to the high frequency matching network bypasses the series L, parallel C circuit and is coupled directly to the preload selection switch which is driven by a preload motor 66.

In the preferred embodiment, the frequency detector 62 is responsive to a transmitted signal in a frequency range of 2–50 MHz to select the high frequency (HF) matching network and responsive to VHF frequencies of 50–80 MHz to select the VHF impedance matching network. Relay K1 positions the movable contacts SK1–1,2 to connect the transmission line 10 to the VHF L matching network.

The individual control logical circuitry responds to the command signals at the outputs of one or more of the sensors for insertion or removal of inductive and capacitive elements in the respective circuits. The use of digital logic enables high speed selection of inductive and of capacitive tuning elements by means of latching relays having contacts SL1-SLn and SC1-SCn, controlled by HF control Logic 68 and contacts SVL1-SVL4 and SVC1-SVC6 controlled by VHF Control Logic 70. Separate Preload Control Circuits 72 are provided for HF frequencies and respond to command signals of the phase and load sensors to provide an output to the preload motor 66 for driving the preload switch for selectively including any one of 32 inductors and matching transformers connected between respective pairs of contacts of the preload switch 74.

In operation, high frequency transmission (2–50 MHz) is coupled to the sensors and one of the outputs of the VSWR sensor is coupled back to the transmitter power amplifier to control the output level to 2 watts during the tuning cycle, and at the termination of the tuning cycle, when the ratio is 1.5:1 or less, the power amplifier is allowed to increase power to 50 watts from the low level of 2 watts. The transmitter, for example, is provided with an automatic gain control in which the low level 1.5:1 output of the VSWR sensor controls the gain to the lower power level of 2 watts during the tuning cycle.

The low power RF signal is coupled via the movable contact SK1–1 to the high frequency matching network set to the HF position by the relay K1 in response to the high level output of the frequency detector. Assuming the voltage standing wave ratio is greater than 1.5:1, a high level output is applied to relay K2 to position movable contacts SK2–1 and SK2–2 to connect the preload directly between the transmission line 10 and antennas 74, bypassing the high frequency L matching network to isolate preload tuning from the L matching network. The preload motor 66 is responsive to a pulse output of the preload control output to step the movable contacts of switch 74 to sequentially insert inductances and tuning transformers connected between the contacts in the motor driven switch 74, having 32 positions, for example, for selection of the proper preload reactance.

The first function of the tuner, therefore, is to select the proper preload inductance coupling the transmission signal past the L network to the preload inductance. The preload motor 66 steps the preload rotary switch 74 through the positions until the proper inductive impedance level of 100 ohms or greater is detected at the 100 ohm output of the load sensor.

After the proper preload inductance has been inserted in the tuner circuit, the 100 ohm output of the load sensor goes to the higher level to indicate the antenna load is 100 ohms or greater. If in addition to detecting 100 ohms or greater, the phase sensor output is low to indicate inductive reactance condition and not a capacitive reactance condition, the preload portion of the cycle is completed and relay K2 is reset by the change in level to move contacts SK2–1 and SK2–2 to the lower position connecting the high frequency L matching network in the tuner circuit. At the beginning of the L network tuning cycle, HF control logic provides that all of the inductive elements L1–L*n* be removed from the L network by closed contacts SL1-Sn which bypass inductive elements L1–L*n*. Also, at the beginning of the tuning cycle after preload, all capacitive elements C1–C*n* are connected in shunt to provide the maximum capacitive condition. As a result, all of the following variations in inductance vary the impedance magnitude while the variations of capacitance change the phase angle of the RF signal coupled to the selected antenna. Subsequent load sensor outputs produce a change in inductance by inserting inductive elements while sensor outputs decrease the capacitance by removal of capacitive elements as described more fully hereinafter. However, since there is some interaction between the inductive and capacitive elements L and C in corresponding impedance magnitude and phase as the proper tune condition is approached, a change in one or other of these different elements may cause the other to overshoot. Thus, the control logic may remove or insert an element to reapproach the desired 50 ohm impedance level and 0 phase condition.

After the preload sequence, therefore, the L network tuning sequence is initiated with none of the inductive elements L1–L*n* in the circuit and all of the capacitive elements C1–C*n* ($C = C_{max}$, $L = L_{min}$). Since the VSWR sensor is monitoring the antenna load, the tuning sequence will continue until the VSWR sensor output applies a high logic level to the HF control logic 68. To achieve the desired ratio, a load and phase sensor output is coupled to the high frequency control logic, directs the insertion and removal of the reactive elements to obtain 0° phase angle and 50 ohm impedance. In general, a tuning sequence involves decrease of capacitive reactance in the L network and increase in the inductive reaction until a tune condition is reached. Since the values are binary, incrementing is provided by a binary sequence including insertion and removal to increase and decrease reactance.

Whenever the transmitted signal is in the very high frequency range, the frequency detector 62 provides a low level output which is inverted to actuate the relay K1 at its reset input to include the very high frequency (VHF) L matching network by positioning movable contacts SK1–1 and SK1–2 to complete the circuit form the transmission line 10 to the selected one of the multiple antennas 64. In the very high frequency range of 50–80 MHz, no preload sequence is desired or required, and the tuner is operated directly into the tuning sequence in which contacts SK1–1, SK1–2 isolate the VHF, L matching network from the HF network. In the VHF, L network, contacts SVL1–4 bypass all of the inductive elements VL1–4 and contacts SVC1–6 are open to bypass all of the capacitors VCI–4. The VHF control logic in block 70 is shown in greater detail in the block diagram of FIG. 4.

Referring now to FIG. 4, the VHF control logic comprises a VHF counter 74 and a VHF C counter 75 having binary count outputs VL1–VL4 and VC1–VC6 for control of inductive and capacitive relays KVL1–4, KVC1–6 coupled to the respective outputs. Relay contacts SVL1–4 and SVCL–6 are actuated in binary sequence to progressively increase the value of inductance advancing the value of capacitance one increment at the end of each cycling of inductance.

The L counter 74 has a clock input coupled to VHF clock source CK3 supplying clock pulses at intervals T0–T15 illustrated by the timing diagram of FIG. **4*a*. The VHF tuning sequence is relatively simple in view of the smaller number of reactive elements required to provide the desired matching to the antenna load. The relay controlled inductive and capacitive elements are cycled through their values in binary increments, i.e., the L counter 74 is responsive to each of gated clock pulses from source CK3. The sequencing of inductive and capacitive elements of incremental binary value in different combinations includes 16 increments in inductive reactance value in the VHF tuning circuit for each incremental advance of capacitive reactance. Unless a tuned condition results prior to reaching the terminal count of the L counter, a terminal count output is produced which is coupled to the input of the C counter to advance any previous count, e.g., the first count inserts capacitive element VC1 by actuation of the relay KVC1 at the set input. As illustrated by the timing diagram in FIG. 4*a*, the L counter is responsive to each of the clock pulses from the clock source CK3 to step the counter through 16 counts and on the 16th count (interval T15) the terminal count output (LTC**) is coupled to the C counter to produce the first stepping of the C counter.

In operation, a tuning cycle is initiated by operation of a tune switch which provides an output indicated in FIG. **4*a* by the waveform SW which is applied to the tuner power supply control relay located in the tuner power supply 76 which is shown and described more fully in the detailed logical schematic infra. Also, it is desirable to provide circuits for delaying the beginning of the count until circuits have stabilized after the tuner power supply has applied power to the clock, counters and other circuits shown in FIG. 4. One of these circuits is the count enable flip flop 77 which is set a predetermined time interval after the turning switch SW has operated, e.g., 10 milliseconds (ms) delay. The count enable flip flop output CE is applied to the L counter to enable the counter to response to the clock pulses applied to the clock input. This enabling signal CE is also applied to the C counter to enable the counter for the terminal count LTC at the end of each cycling of the L counter (time T15**).

In response to the first clock pulse after enabling the L counter, the first count output VL1 is raised to the high logical level to actuate the relay KVL1 at the set input which inserts the lowest inductive element in the VHF matching network of the tuning circuit.

During the tuning cycle, the VSWR sensor is monitoring the antenna load impedance and an output ratio of 1.5:1 or less will produce a high logical level signal at input VT of logic gate 78 to gate the clock pulse CK3 to provide a reset pulse at the input to the count Enable flip flop to produce a low logical level output CE for disabling the L and C counters. The reset pulse is also applied to the tuner power supply to remove tuner power from the tuning circuit. The output of gate 78 is coupled through a NOR gate to provide the reset pulse; the NOR gate also having an input coupled to AND gate 79 having terminal count inputs LTC and CTC from L and C counters 74 and 75, respectively. Concurrent high logical level terminal counts indicate all possible LC combinations have been exhausted without sensing a tuned condition of 1.5:1 voltage standing wave ratio as otherwise provided by the VSWR sensor sensing a tuned condition during tuning. The abnormal condition produces a high level output and is indicated to the operator by appropriate gating of the output of gate 79.

Continuing the description of the operation from the first count of the L counter, it is assumed for purposes of explanation of operation that no tuned condition is reached at the first count, the L counter is responsive to the second clock pulse to provide a high logical level output on counter output VL2 and count output VL1 is returned to a low logical level. The L counter will continue to be responsive to the clock pulses supplied by the clock CK3 to provide a binary count at the outputs of VL1, VL2, VL3 and VL4 until a tuned condition is reached or all combinations of L and C are exhausted. Since corresponding inductive elements VL1, VL2, VL3 and VL4 are progressed in binary value, 16 increments of inductive reactance are provided from the inductive reactance value of the lowest inductive element VL1 to the sum of the inductive reactance of VL1 to VL4. Upon the receipt of the last count, the L counter provides the terminal count LTC at its output which is coupled to the C counter to insert capacitive element VC1 by producing a high logical level on the corresponding counter output VC1. In this manner, the L counter is effective to sequence the inductive elements for each capacitive reactance provided by the capacitor elements sequentially inserted from the tuner circuit by the C counter outputs VC1–VC6 providing a binary count at the outputs. Since the six capacitor elements are incremented in binary value, the binary count outputs of the C counter will provide a range of capacitive reactance corresponding to the range of inductive reactance for obtaining a tuned condition for the antenna selected from the multiple antenna 64 shown in FIG. 3.

The use of multiple relays provides for a large number of reactance values to be inserted in the L matching networks of the tuner circuit. In order to maintain the operation within the required low power dissipation restrictions, latching type relays requiring power only during a short actuation time of 2 ms have been provided. These relays KVL1–KVL4 and KVC1–KVC6 are capable of withstanding high voltages of 1,000v (RMS) and higher. The current carrying capacity of the contacts is approximately 2 amps of RF current. The latching relays are contained in a standard hermetically sealed package of a type referred to as a half crystal can configuration. Also, the package for the sealed latching relay is constructed to reduce the stray capacity to approximately 1.5 picofarads (pf).

Referring now to FIG. 5, digital control circuits for Preload L/T and HF tuning are shown by schematic block diagram. Details of the logic are shown by circuit schematics of FIGS. 6–9 having entitled circuits (enclosed by dashed lines) corresponding to the blocks of FIG. 5. The sequence of operation of the tuner cycle for high frequency transmission in the 20–50MHz range is initiated by the switch for manual begin command which sets or resets a latch in the block, Start Command, having start outputs coupled to Preload Command Logic, Power Control Switch and TMax Timer blocks for initiating the preload sequence of the tuning cycle. The Power Control Switch applies power to the tuner control circuits in response to the start command which power is removed after completion of the tuning cycle by Sequence Stop Logic. The latter is responsive to the 1.5:1 VSWR output indication of the completion of the tuning cycle, time lapse exceeding the maximum time interval (TMax) or a failure of preload matching, i.e., after all 32 selections of preload inductance have been counted and a Preload Detector block has not detected an inductive ($\bar{\phi}$) 100 ohm antenna impedance condition. The Sequnce Stop Logic is also responsive to a CMin condition which is a condition of failure to tune the high frequency L/C of the matching network. The logical circuits for these conditions are disclosed in detail in FIG. 8 which also shows the schematic diagram for the preload control circuits.

The Preload Clock Generator provides the preload clock pulses TS1 and clock gating pul;es TS1JK which are provided by a J-K flip flop in response to the clock pulses. The gating pulses TS1JK are available at one-half the clock rate and after the clock pulses (e.g., trailing edge) for controlling the logic gates for producing motor pulses MTRPLS to Preload Pulse Counter and Preload Motor according to sensed conditions during clock pulses TS1. Gating pulses TS1JK also gate the output of the Preload Detector on alternate clock pulses $\overline{TS1}$.

In order to satisfy the logical conditions for preload, the Preload L/T inductance must not only produce an inductive ($\bar{\phi}$) load of J100 ohms, but also the Preload L/C rotary switch 74 (FIGS. 3 and 8a) must be located by the proper group of contact positions including group positions 1 to 5 assigned to a tapped transformer for 21–50 MHz frequency range and group positions 6–32 assigned to individual inductors for 2–20 MHz frequency range. Preload LIT switch position 32 is assigned to the inductor group but actually does not include an inductor for a minimum inductance position which corresponds to HF network bypass wherein relay K1 is actuated to remove the preload L/C and HF match network and substitute the VHF, L matching network by contacts SK1–1 and SK1–2. In FIG. 5, the HF position frequency input provides a high logical level indicating the rotary contact of the preload L/C switch 74 is located in the proper group of contact positions for the selected frequency range in the high frequency band, i.e., as shown in FIG. 8*a*, group 6 to 32 for 2–20 MHz or group 1 to 5 for 21–50 MHz. Movable contact 80 is positioned automatically with frequency selection connecting ground to the opposite group of contacts, e.g., contact 80 connects ground to contact group 1–5 to provide a high logical level to contact group 6–32 for tuning in the frequency range of 2 to 20 MHz, as shown.

Continuing the description of operation, the Preload Detector is responsive to high logical levels including $\phi$ sense, 100 ohm and HF position frequency (output), when the proper Preload L/T inductance is selected, to gate the preload clock $\overline{TS1}$ and gating clock TS1JK through a NAND gate to reset a flip flop in the Preload Command Logic block (FIGS. 5 and 8) to provide the preload completed output $\overline{U}$ to L-C Preset Logic to initiate tuning of the high frequency L-C impedance matching network (FIG. 3) by control of parallel sequencing of binary valued inductors and capacitors which are inserted and removed by latching relays coupled to the outputs of respective L and C counters. The high frequency L-C impedance matching network is actively inserted in the antenna tuning circuit by resetting of relay K2 (FIG. 3) which is shown in a simplified manner in FIG. 3 as actuated by inversion of input PL. As shown in FIG. 8, "tuner in" and "tuner out" driver outputs are provided in an alternate arrangement for reset and set inputs, respectively, of relay K2.

As illustrated in FIG. 5, L-C Up-Down Logic Control operates the L Counter and the C Counter in parallel, stepping the counters to match the antenna impedance to a real antenna impedance of 50 ohms, for example. To this end, logical inputs 50 ohm and $\phi$ are provided to the Logic Control block to control the stepping of the L and C counters and, in general, to decrease the capacitance which is initially reset by $\overline{STOS}$ to maximum capacitance (CMax); and increase the inductance, which is reset by $\overline{STOS}$ to minimum inductance (LMin). As shown by the logical schematic in FIG. 9, the input $\phi$ is applied to gate 90 along with clock pulses TS2 from the L-C Clock Generator (FIG. 5). The output of gate 90 is inverted and coupled to J-$\overline{K}$ inputs of flip-flop 92 which is set (master to slave) by clock gating pulses JKCP following after each of the TS 2 clock pulses. A capacitive condition of the antenna impedance provides a high level input $\phi$ from the Phase Sensor (FIG. 1*a*) to provide a high level output from the Q output of flip-flop 92 to NAND gate 94 having its outputs coupled to the count down input CCD of the C Counter (FIG. 5). The other input of gate 84 is provided by gated clock pulses TS2 passed by NAND gate 95 of the L-C Counter Enable circuit which is provided only after the preload sequence is completed, i.e., in response to outputs $\overline{U}$ and also motor pulse inhibit output MTRST (YY). An inductive condition of the antenna impedance provides a low level $\phi$ input to provide a high level $\overline{Q}$ output from flip flop 92 to gate 96 which passes clock pulses to the count up input CCU of the C Counter. Gate 96 has three inputs and is inhibited by a low level $\overline{CMax}$ input, i.e., enable when the C Counter is not at a maximum count. The C Counter control logic provides for either count up or down on each clock pulse TS2 except when count up is inhibited by a maximum capacitance. The NAND gates and inputs therefore to provide $\overline{CMax}$ and also gates for $\overline{CMin}$ and $\overline{LMin}$ are shown in FIG. 7. The C Counter counts in response to gated clocks TS2 at counter inputs CCD or CCU, i.e., (TS2) for count down and $\overline{Q}$(TS2) $\overline{CMax}$ for count down.

The control logic for the L counter is responsive to the 50 ohm output of the Load Sensor (FIG. 1*b*) which output is coupled to the input gate 98 to control the state of flip flop 99 to provide a high logical level at output Q or Q for count up LCU or count down LCD, respectively, of the L counter for arriving at a sensed inductive impedance of 50 ohms. A common inhibit line to gates 100 and 101 inhibits counting of the L counter during preload described earlier in connection with the control for the C Counter. After the preload sequence is completed, clock pulses TS2 are passed to the inputs of gates 100, 101 to provide a clocked pulsed output to either the count up or count down input of the L Counter.

At the beginning of L-C tuning intervals, the L-C counters provide maximum capacitance and minimum inductance to approach antenna impedance matching. This procedure avoids false resonance conditions which occur at certain frequencies for many antennas when matching is initiated by minimum capacitance. The present invention provides a sequence for overcoming load sensor indications of low impedance at maximum capacitance by providing for increasing the inductance at maximum capacitance (CMax) and minimum inductance (LMin) i.e., by inhibiting count down output at gate 100 by inhibiting the input thereto from NOR gate 102 having a $\overline{LMin}$ input. The other input to gate 102 is from the Q output of flip flop 97 which inhibits the output for an L count down at minimum inductance (LMin) and maximum capacitance (CMax), which are coupled to flip flop 97 reset input from NAND gate 103. At the same time, the CMax, LMin (high level) output of gate 103 coupled to reset input of flip flop 97 provides a high level $\overline{Q}$ output which enables a NAND gate 104 to pass clock pulses TS2 to NOR gate 105 to provide another source of count-up pulses for the L counter to overcome a possible low impedance sensed condition tending to cause count down of the L counter at the beginning of the L-C sequence of the tuning cycle. The pulse output of gate 104 is coupled to the count up input LCU which will increase the inductance to rapidly overcome this condition. Once the capacitance is reduced from maximum by count down of the C counter, in response to $-\phi$ excessive capacitance condition, a true impedance condition will be sensed by the load sensor and this auxiliary control logic for the maximum capacitance is no longer needed in the current tuning cycle. In the absence of the auxiliary control logic for the L counter, repeated count down inputs to the L counter are produced by gate 100 which cause unwanted operation of the relay KL1 which is shown in FIG. 6 to be connected to the L counter binary ouput L1.

As shown in FIGS. 5 and 6, the L counter outputs L1–L*n* are coupled to relays KL1–KL*n*, and the C Counter outputs are coupled to relays KC1–KC*n* to provide parallel sequencing of fixed inductive and capacitive elements having values arranged in binary sequence to increase the inductance and decrease the capacitance of the antenna impedance matching network with the count up of the L and C counters. The individual digital control loops for the counters are in parallel and responsive to respective phase $\phi$ and load sensors to control the count up or count down of respective L and C counters until the inductance and capacitance of the impedance matching network presents the proper antenna impedance for transmission at any selected frequency in the high frequency range, e.g., 2 to 50 MHz.

The condition of zero phase angle and 50 ohm impedance as sensed will result in a standing wave ratio (VSWR) output of 1.5:1, indicating a system tuned condition which will provide a high logical level VT input to the Sequence Stop Logic (FIG. 8) to enable its AND gate to pass clock pulses TS2 to provide output $\overline{VTI}$ and operate the one-shot via the NOR gate. The one-shot output is coupled to the reset winding of the Power Control Switch to disconnect tuner power to complete the tuning cycle.

The output $\overline{VTI}$ is coupled to the set input of the flip flop in the L-C Counter Enable (FIG. 9) to provide a system tuned output for "system tuned" indicators on the transceiver and to inhibit count up or count down outputs for L & C counters by disabling the NAND gate having other inputs J, TS2 and $\overline{MTRST}$.

The preferred embodiment of the system tuning arrangement includes many features which resulted from operation of the tuner over broad bands of frequencies with antennas of the following types: 15, 9 and 6 foot whip, antennas, 300 foot wire antenna and half wave doublet antenna. Also, the relay controlled reactances arranged in binary values and selected by binary counter outputs provided for the maximum number of possible combinations of reactances that are obtainable in a minimum time interval and with a minimum of control circuitry. Further, the system arrangement provides for separate antenna impedance matching networks for high frequency (e.g., 2 to 50 MHz) and very high frequency (e.g., 50 to 80 MHz) ranges to minimize the tuning time for very high frequencies while providing preload reactance, selection and tuning required for high frequencies, and the preload reactance associated with the antenna reduces the standing wave ratio for the relay controlled reactive elements, i.e., to have sufficient tuning range to tune at high frequencies. At high frequencies the tuning time is minimized by the use of automatic sensing of antenna parameters and preload requirement. In practice, it has been found that the maximum preload cycle time, when required, is approximately 1.5 seconds and the average time is 0.5 seconds. After the preload sequence, the maximum time required to provide the HF L-C tuning is 1.5 seconds and the average tuning time is 0.8 seconds. At higher frequencies the total tuning time is less than 1 second and the average total tuning time os 0.3 second. The tuning of the system is primarily limited by relay activation time and as solid state devices become available, the substitution of solid state switches capable of switching and carrying the power requirements the tuning cycle time will decrease accordingly. In tuning at high frequencies with relays, the effect of stray shunt capacity could limit the tuning range and isolation is provided to minimize any stray capacity.

The provision of broad band sensor circuits is important in providing for monitoring of antenna reactances continuously while also providing rapid, flat response over the entire frequency range for accurate tuning to a standing wave ratio of less than 1.5:1. Further, independently and simultaneously sensing and switching of the real and reactive antenna components reduces the tuning time approximately 50 percent. This, as has been shown, is accomplished by having two identical logic control circuit loops; one controlling the inductive and the other controlling the capacitive tuning elements. The controlled inputs to these circuits are derived from two independent phase and impedance sensors.

The tuning cycle, therefore, is initiated only if the standing wave ratio, as sensed, is out of the acceptable limits, for example, 3:1. Upon determining that the standing wave ratio is greater than 3:1 the preload switch assembly, indicated by reference number 74 in FIG. 3, is cycled by preload motor 66 controlled by preload control circuit 72 and stopped at the first position at which a 100 ohm impedance crossover is sensed and the phase angle appears inductive $+\phi$. After the preload sequence, the HF control logic 68 cycles the relay control inductive and capacitive elements through their values in binary increments simultaneously as directed by the phase and impedance sensors. The HF control circuits seek a zero phase angle and an antenna impedance of 50 ohms. As the phase and impedance is approached in the L-C combination, providing a standing wave ratio of less than 1.5:1 produces the VSWR output of 1.5:1 for terminating the tuning cycle, disconnecting the tuning power and providing an output for increasing the transmission power to a high level.

The basic tuning algorithm disclosed includes many improvements are disclosed by the preferred embodiment, and the relay control matrix and the sensors can be simplified or combined in any configuration as needed for the particular tuning requirements of the system under consideration.

Thus, at the time the tuning cycle is initiated, if the standing wave ratio is within the limits specified, the system automatically switches to high power transmission without tuning. On the other hand, if the standing wave ratio as sensed is out of limits, the tuning cycle is initiated. Normally the transceiver is provided with a tune switch, e.g., the microphone key and tuning is completed by the time the operator commences talking because of the short time interval of less than 3 seconds required for the tuning cycle. In the event a tuned condition cannot be attained which satisfies the standing wave ratio limits, the cycle is terminated and an indication is provided to the operator that the system has not been tuned. Also during monitored transmission, if the standing wave ratio exceeds the allowable limits, a command line is energized for signalling the operator.

In the light of the above teachings of the preferred embodiment disclosed, various modifications and variations of the present invention are contemplated and will be apparent to those skilled in the art without departing from the spirit and scope of the invention. Many of these variations have been discussed and as was noted, the particular application of the present invention to specific applications often determines the arrangement for simplifying the cycle of operations.

What is claimed is:

1. An antenna tuner for transforming the impedance of an antenna to the load resistance required for transfer of power to the antenna over a range of transmission frequencies comprising:

an impedance matching network including a plurality of reactance elements incremented in value to provide reactive increments for selectively matching of antenna impedance over the range of transmission frequencies in a tuning cycle;

switching means for selectively connecting the reactance elements to the antenna for transforming the impedance of the antenna to the desired load resistance for transfer of power to the antenna during transmission; and digital control means for providing a control loop including impedance sensing means for detecting the impedance of the antenna including the reactance elements connected to the antenna to form said matching network to provide a digital output; said control means further including logical control circuits coupled to said switching means and responsive to the digital output to actuate said switching means to selectively connect the reactance elements to form an impedance matching network from a combination of reactances providing the desired load resistance for transfer of power to the antenna at the selected frequency over the range of transmission frequencies, said control means further including a standing wave ratio detector coupled to the tuner to detect the ratio of forward and reflected standing waves in the transfer of power to the antenna for controlling the tuning cycle.

2. The antenna tuner according to claim 1 in which said reactance elements include capacitive and inductive elements which are incremented in value in binary increments and the switching means is responsive to said digital control means to provide for selection of both capacitive and inductive elements to produce a combination of capacitive and inductive reactance values for matching to the dynamic status of antenna impedance to the desired load resistance in the tuning cycle for power transfer to the antenna.

3. The antenna tuner according to claim 1 in which said standing wave ratio detector detects the tuning of the antenna impedance in order to provide a control output for controlling the initiation and duration of the tuning cycle according to a desired impedance matching to the antenna.

4. An antenna tuner for transforming the impedance of an antenna to the load resistance required for transfer of power to the antenna over a range of transmission frequencies comprising:

an impedance matching network including a plurality of reactance elements incremented in value to provide reactive increments for selectively matching of antenna impedance over the range of transmission frequencies in a tuning cycle;

switching means for selectively connecting the reactance elements to the antenna for transforming the impedance of the antenna to the desired load resistance for transfer of power to the antenna during transmission;

digital control means for providing a control loop including impedance sensing means for detecting the impedance of the antenna including the reactance elements connected to the antenna to form said matching network to provide a digital output;

said control means further including logical control circuits coupled to said switching means and responsive to the digital output to actuate said switching means to selectively connect the reactance elements to form an impedance matching network from a combination of reactances providing the desired load resistance for transfer of power to the antenna at the selected frequency over the range of transmission frequencies;

said digital control means including decision circuit means for automatic tuning including means for detecting the tuning of the antenna impedance in order to provide a digital ouput for controlling the initiation and duration of the tuning cycle according to a desired impedance matching to the antenna; and a transmitter power amplifier coupled to said tuner, said control output being coupled to said power amplifier to control the level of power transmission to provide low transmission power during the tuning cycle.

5. An antenna tuner for transforming the impedance of an antenna to the load resistance required for transfer of power to the antenna over a range of transmission frequencies comprising:

an impedance matching network including a plurality of reactance elements incremented in value to provide reactive increments for selectively matching of antenna impedance over the range of transmission frequencies in a tuning cycle;

switching means for selectively connecting the reactance elements to the antenna for transforming the impedance of the antenna to the desired load resistance for transfer of power to the antenna during transmission;

digital control means for providing a control loop including impedance sensing means for detecting the impedance of the antenna including the reactance elements connected to the antenna to form said matching network to provide a digital output;

said control means further including logical control circuits coupled to said switching means and responsive to the digital output to actuate said switching means to selectively connect the reactance elements to form an impedance matching network from a combination of reactances providing the desired load resistance for transfer of power to the antenna at the selected frequency over the range of transmission frequencies;

said digital control means including decision circuit means for automatic tuning including means for detecting the tuning of the antenna impedance in order to provide a digital output for controlling the initiation and duration of the tuning cycle according to a desired impedance matching to the antenna;

said decision circuit means including a standing wave ratio detector coupled to the tuner to detect the ratio of forward and reflected standing waves over a broad band range of requencies.

6. The antenna tuner of claim 5 in which said broad band includes a range of frequencies from approximately 2 MHz to 80 MHz.

7. An antenna tuner for transforming the impedance of an antenna to the load resistance required for transfer of power to the antenna over a range of transmission frequencies comprising:

an impedance matching network including a plurality of reactance elements incremented in value to provide reactive increments for selectively matching of antenna impedance over the range of transmission frequencies in a tuning cycle;

switching means for selectively connecting the reactance elements to the antenna for transforming the impedance of the antenna to the desired load resistance for transfer of power to the antenna during transmission;

digital control means for providing a control loop including impedance sensing means for detecting the impedance of the antenna including the reactance elements connected to the antenna to form said matching network to provide a digital output;

said control means further including logical control circuits coupled to said switching means and responsive to the digital output to actuate said switching means to selectively connect the reactance elements to form an impedance matching network from a combination of reactances providing the desired load resistance for transfer of power to the antenna at the selected frequency over the range of transmission frequencies;

said digital control means including decision circuit means for automatic tuning including means for detecting the tuning of the antenna impedance in order to provide a digital output for controlling the initiation and duration of the tuning cycle according to a desired impedance matching to the antenna; and a source of power for said tuner, said decision circuit means being coupled to the tuner power source for controlling the supply of power to the tuner for tuning for the duration of any tuning cycle.

8. An automatic antenna tuner comprising:

an antenna impedance matching network including a plurality of groups of reactance elements, each group digitally incremented in value;

digital control means including a plurality of sensing means for detecting phase and impedance load in response to any selected frequency of a broad band frequency range of transmission in an antenna tuning cycle and logical control circuit means automatically responsive to said sensing means to select digital increments of reactance of respective groups for controlling the reactance of the respective groups to transform antenna impedance to the load resistance for power transfer of any selected frequency of the broad band frequency range; and standing wave ratio detector means responsive to the standing wave ratio of power transfer at the selected frequency for automatically controlling the tuning cycle.

9. The automatic antenna tuner according to claim 8 in which said standing wave ratio detector means includes decision circuit means having means for sensing antenna impedance matching condition to provide a digital output in response to transmission at the selected frequency for controlling the initiation and duration of the antenna tuning cycle.

10. The automatic antenna tuner according to claim 8 in which said control means includes individual closed loop control circuits for controlling the respective groups of reactance elements in a tuning cycle.

11. The automatic antenna tuner of claim 10 in which said plurality of sensing means includes phase sensing means responsive to the phase of transmission of any selected frequency to provide an output to said logical control circuit means for controlling the reactance of the matching network to provide aprpoximately a zero phase angle, the load sensing means responsive to the impedance of the network to transmission to provide an output to said logical control circuit means for concurrently controlling the reactance of the matching network to provide a predetermined load impedance at approximately zero phase angle.

12. the automatic antenna tuner according to claim 11 in which said impedance matching network comprises a group of capacitive reactance elements and a group of inductance reactance elements, and said control means includes the individual closed loop control circuits from said phase sensing means and load sensing means to respective capacitive and inductive element groups for automatically controlling the phase and impedance of said impedance matching network.

13. The automatic antenna tuner according to claim 12 in which said group of inductive elements are connected in series and said group of capacitive elements are connected in shunt in said antenna impedance matching network.

14. The automatic antenna tuner according to claim 12 in which said groups of elements are binary incremented in value and said logical control circuit means includes means for selection of elements in a binary sequence for controlling the reactance of the respective group.

15. The automatic antenna tuner according to claim 14 in which the groups of reactive elements in impedance matching network are reset at the start of the tuning cycles to include a predetermined reactance in the network.

16. An automatic antenna tuner comprising:

an antenna impedance matching network including a plurality of groups of reactance elements, each group digitally incremented in value; and a plurality of antennas including antennas having different antenna impedances adapted to be selectively coupled to said impedance matching network, digital control means including a plurality of sensing means for detecting phase and impedance load in response to any selected frequency of a broad band frequency range of transmission in an antenna tuning cycle and logical control circuit means automatically responsive to said sensing means to select digital increments of reactance of respective groups for controlling the reactance of the respective groups to transform antenna impedance to the load resistance for power transfer of any selected frequency of the broad band frequency range.

17. An automatic antenna tuner comprising:

an antenna impedance matching network including a plurality of groups of reactance elements;

control means including a plurality of sensing means for detecting the reactance of a respective group in response to any selected frequency of a broad band frequency range of transmission in an antenna tuning cycle and logical control circuit means automatically responsive to said sensing means for controlling the reactance of the respective group to provide impedance matching for transmission by an antenna adapted to be coupled to said matching network;

said antenna tuner further including a preload reactance network including a plurality of preload reactance elements and switching means for sequentially selecting said elements and said control means includes means for automatically sensing the range of antenna impedance for selecting a desired preload reactance in a preload tuning sequence.

18. The automatic antenna tuner according to claim 17 in which said control means further includes switching means for isolating the preload reactance network from the impedance matching network for independently selecting a preload reactance for tuning in combination with the impedance matching network including the selected preload reactance.

19. The automatic antenna tuner according to claim 18 in which the control means includes means for automatically terminating the preload sequence upon sensing a preload impedance providing an antenna impedance in the range of tuning to the desired antenna impedance by the impedance matching network.

20. An automatic antenna tuner comprising:

an antenna impedance matching network including a plurality of groups of reactance elements;

control means including a plurality of sensing means for detecting the reactance of a respective group in response to any selected frequency of a broad band frequency range of transmission in an antenna tuning cycle and logical control circuit means automatically responsive to said sensing means for controlling the reactance of the respective group to provide impedance matching for transmission by an antenna adapted to be coupled to said matching network;

said antenna tuner further including a transmission line for coupling a transmitter to said impedance matching network, and ratio sensing means coupled to said transmission line for detecting the standing wave ratio of transmission, said ratio sensing means including threshold means responsive to a predetermined standing wave ratio of transmission to provide an output to said logical control circuit means for terminating the tuning cycle.

21. The automatic antenna tuner according to claim 20 in which said ratio sensing means further includes upper threshold means responsive to a predetermined upper standing wave ratio to provide an output for indicating the degree of antenna tuning.

22. An automatic antenna tuner comprising:

an antenna impedance matching network including a plurality of groups of reactance elements;

control means including a plurality of sensing means for detecting the reactance of a respective group in response to any selected frequency of a broad band frequency range of transmission in an antenna tuning cycle and logical control circuit means automatically responsive to said sensing means for controlling the reactance of the respective group to provide impedance matching for transmission by an antenna adapted to be coupled to said matching network;

said logical control circuit means includes means responsive to predetermined conditions of tuning for terminating an antenna tuning cycle prior to completion of antenna impedance matching for transmission via said antenna.

23. The automatic antenna tuner according to claim 22 in which said network includes a variable preload reactance, varying said preload reactance in a preload sequence and said logical control circuit means includes means for timing said preload sequence in an antenna tuning cycle for terminating the antenna tuning cycle after a predetermined maximum time period for said sequence.

24. An automatic antenna tuner for transforming the impedance of an antenna to the resistive load of the output of a transmitter for transmission over a range of frequencies in an antenna tuning operation comprising:

impedance matching circuit means including capacitive and inductive reactance means, each incrementally variable in value in a digital sequence in response to digital control signals; and digital control circuit means including sensing means for sensing the phase and impedance of transmission of any selected frequency in the range of frequencies of the antenna transformed by the impedance matching circuit means to produce digital output signals indicating phase and impedance digitally, and digital logic circuit means having an input for said digital output signals and responsive thereto to produce digital control signals at the output thereof for digital control of the reactance values of the impedance matching circuit means in the digital sequence of antenna tuning to transform the antenna impedance to the resistive load of the output of the transmitter for transmission;

said impedance matching circuit means includes a plurality of individual impedance matching L networks for corresponding bands of frequency transmission in the range of frequencies and network selection circuit means are provided for selection of one of the networks corresponding to the band of frequencies of the selected frequency of transmission.

25. The automatic antenna tuner according to claim 24 which further includes a plurality of digital logic circuit means having inputs for said digital output signals and said plurality of digital circuit means include respective outputs for providing digital control signals for digital control of the variation in reactance values of respective L networks for matching of impedance in the corresponding selected frequency band.

26. The automatic antenna tuner according to claim 25 in which the individual impedance matching L networks include a high frequency network for impedance matching of a selected frequency of transmission in a high frequency band from approximately 2 to 50 MHz and a very high frequency L network for impedance matching of a selected frequency in a very high frequency band from approximately 50 to 80 MHz.

27. An automatic antenna tuner for transforming the impedance of an antenna to the resistive load of the output of a transmitter for transmission over a range of frequencies in an antenna tuning operation comprising:

impedance matching circuit means including capacitive and inductive reactance means, each incrementally variable in value in a digital sequence in response to digital control signals; and digital control circuit means including sensing means for sensing the phase and impedance of transmission of any selected frequency in the range of frequencies of the antenna transformed by the impedance matching circuit means to produce digital output signals indicating phase and impedance digitally, and digital logic circuit means having an input for said digital output signals and responsive thereto to produce digital control signals at the output thereof for digital control of the reactance values of the impedance matching circuit means in the digital sequence of antenna tuning to transform the antenna impedance to the resistive load of the output of the transmitter for transmission; said sensing means includes a standing wave ratio detector.

28. The automatic antenna tuner according to claim 27 in which said standing wave ratio detector includes detector circuit means for producing digital output signals indicating the standing wave ratio of transmission at any selected frequency in the range of frequencies of transmission and said digital logic circuit means includes circuit means responsive to the digital output signals for determining initiation and duration of control of reactance in an antenna tuning operation.

29. The automatic antenna tuner according to claim 28 in which said detector circuit means includes means for producing digital output signals including upper and lower levels of standing wave ratios of transmission and said digital logic circuit means includes circuit means responsive to said upper level of standing wave ratio during transmission to terminate transmission.

30. An automatic antenna tuner for transforming the impedance of an antenna to the resistance load of the output of a transmitter for transmission over a range of frequencies in an antenna tuning operation comprising:

impedance matching circuit means including capacitive and inductive reactance means, each incrementally variable in value in a digital sequence in response to digital control signals; and digital control circuit means including sensing means for sensing the phase and impedance of transmission of any selected frequency in the range of frequencies of the antenna transformer by the impedance matching circuit means to produce digital output signals indicating phase and impedance digitally, and digital logic circuit means having an input for said digital output signals and responsive thereto to produce digital control signals at the output thereof for digital control of the reactance values of the impedance matching circuit means in the digital sequence of antenna tuning to transform the antenna impedance to the resistive load of the output of the transmitter for transmission, said digital logic circuit means includes circuit means for producing digital control signals to increase or decrease the reactance of at least one of the incrementally variable capacitive and inductive reactances throughout the range of variation in reactance thereof in response to said digital output signals of said sensing means.

31. An automatic antenna tuner for transforming the impedance of an antenna to the resistive load of the output of a transmitter for transmission over a range of frequencies in an antenna tuning operation comprising:

impedance matching circuit means including capacitive and inductive reactance means, each incrementally variable in value in a digitial sequence in response to digital control signals; and digital control circuit means including sensing means for sensing the phase and impedance of transmission of any selected frequency in the range of frequencies of the antenna transformed by the impedance matching circuit means to produce digital output signals indicating phase and impedance digitally, and digital logic circuit means having an input for said digital output signals and responsive thereto to produce digital control signals at the output thereof for digital control of the reactance values of the impedance matching circuit means in the digital sequence of antenna tuning to transform the antenna impedance to the resistive load of the output of the transmitter for transmission;

said digital logic circuit means includes circuit means responsive to said digital output signals of said sensing means for producing digital control signals to individually decrease or increase the reactance of said capacitive and inductive reactance means.

* * * * *